US 8,548,975 B1

(12) United States Patent
Bharat et al.

(10) Patent No.: US 8,548,975 B1
(45) Date of Patent: *Oct. 1, 2013

(54) SYSTEMS AND METHODS FOR BROWSING HISTORICAL CONTENT

(75) Inventors: Krishna Bharat, Santa Clara, CA (US); Michael Curtiss, Mountain View, CA (US); Duane Scott Hess, Cupertino, CA (US); Kerah Pelczarski, Mountain View, CA (US); Marissa Mayer, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/411,045

(22) Filed: Mar. 2, 2012

Related U.S. Application Data

(63) Continuation of application No. 10/813,586, filed on Mar. 31, 2004, now Pat. No. 8,131,702.

(51) Int. Cl.
*G06F 17/30* (2006.01)

(52) U.S. Cl.
USPC ........... 707/708; 707/706; 707/709; 707/725; 707/737; 707/798

(58) Field of Classification Search
USPC .................. 707/706, 798, 708, 709, 725, 737
See application file for complete search history.

(56) References Cited

U.S. PATENT DOCUMENTS

| | | | |
|---|---|---|---|
| 5,819,032 A | 10/1998 | De Vries et al. | |
| 6,012,044 A * | 1/2000 | Maggioncalda et al. | ... 705/36 R |
| 6,020,898 A * | 2/2000 | Saito et al. | ..... 345/440 |
| 6,023,280 A * | 2/2000 | Becker et al. | ..... 345/440 |
| 6,151,600 A | 11/2000 | Dedrick | |
| 6,236,987 B1 | 5/2001 | Horowitz et al. | |
| 6,553,373 B2 * | 4/2003 | Boguraev et al. | ..... 1/1 |
| 6,574,632 B2 | 6/2003 | Fox et al. | |
| 6,829,599 B2 | 12/2004 | Chidlovskii | |
| 6,961,954 B1 * | 11/2005 | Maybury et al. | ..... 725/53 |
| 7,171,619 B1 * | 1/2007 | Bianco | ..... 715/206 |
| 7,292,245 B2 | 11/2007 | Goggin | |
| 8,131,702 B1 | 3/2012 | Bharat et al. | |
| 8,269,774 B2 * | 9/2012 | Buck | ..... 345/440.2 |
| 2002/0105532 A1 | 8/2002 | Oblinger | |
| 2002/0107842 A1 | 8/2002 | Biebesheimer et al. | |
| 2002/0149614 A1 | 10/2002 | Biebesheimer et al. | |
| 2004/0027349 A1 | 2/2004 | Landau et al. | |
| 2004/0059705 A1 | 3/2004 | Wittke et al. | |
| 2004/0177149 A1 | 9/2004 | Zullo et al. | |
| 2005/0071766 A1 | 3/2005 | Brill et al. | |
| 2005/0091591 A1 * | 4/2005 | Boguraev et al. | ..... 715/526 |
| 2005/0091596 A1 * | 4/2005 | Anthony et al. | ..... 715/712 |
| 2005/0162423 A1 * | 7/2005 | Goggin | ..... 345/440 |
| 2008/0091656 A1 * | 4/2008 | Charnock et al. | ..... 707/3 |
| 2008/0201159 A1 | 8/2008 | Gabrick et al. | |
| 2009/0089254 A1 | 4/2009 | Von Kaenel et al. | |
| 2009/0326926 A1 * | 12/2009 | Landau et al. | ..... 704/9 |

* cited by examiner

*Primary Examiner* — Thanh-Ha Dang
(74) *Attorney, Agent, or Firm* — Harrity & Harrity, LLP

(57) ABSTRACT

A system graphically plots articles. The system executes one or more search queries to search stored articles and receives results of the executed one or more search queries, where the results identify selected articles of the stored articles. The system further designates a graphical marker for each of the selected articles and plots each of the graphical markers on a graphical display.

20 Claims, 10 Drawing Sheets

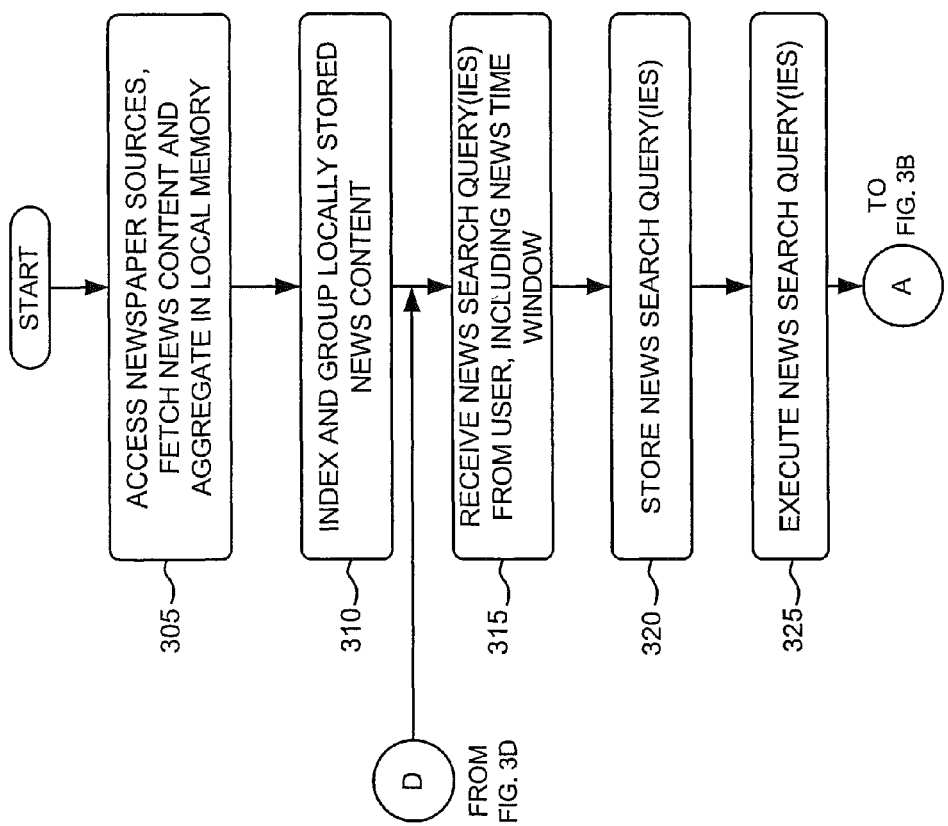

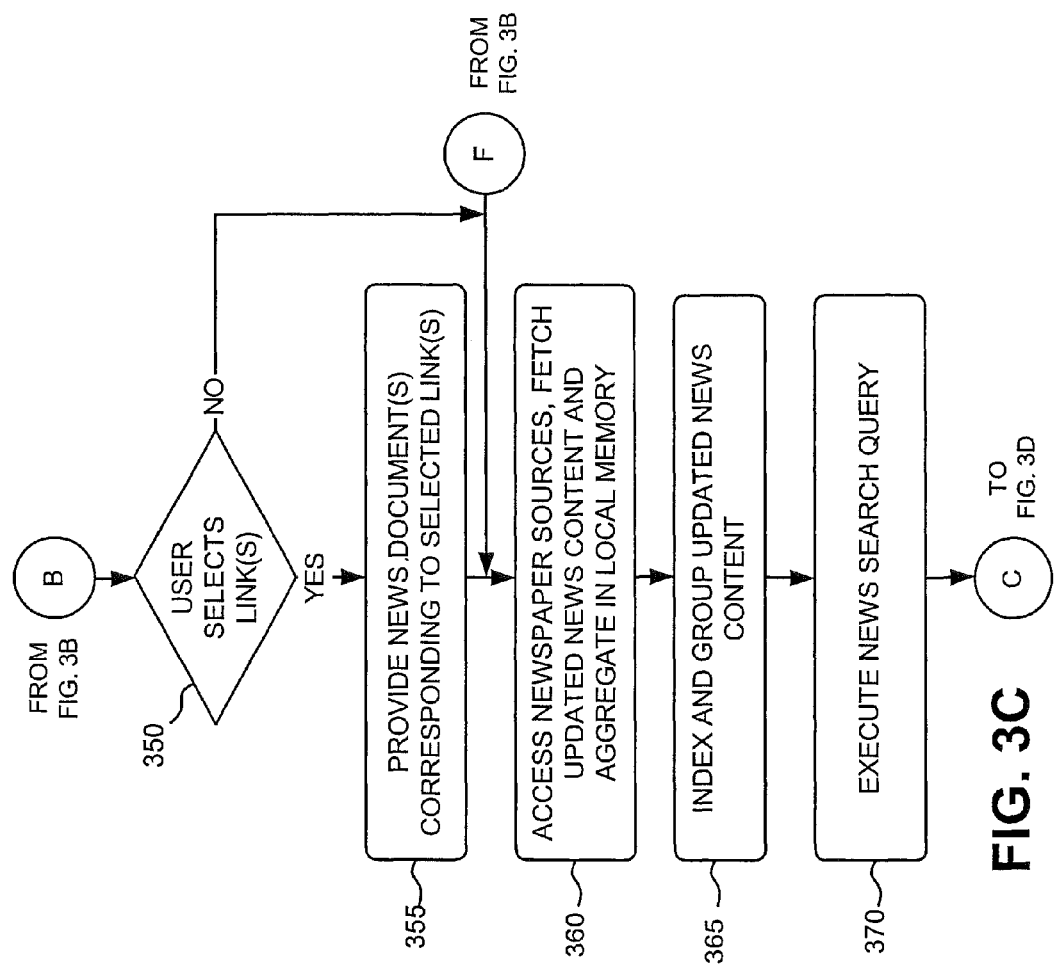

ary news document according to an implementation consistent with the principles of the invention.

SYSTEMS AND METHODS FOR BROWSING HISTORICAL CONTENT

RELATED APPLICATION

This application is a continuation of U.S. patent application Ser. No. 10/813,586 filed Mar. 31, 2004, which is incorporated herein by reference.

BACKGROUND OF THE INVENTION

1. Field of the Invention

The present invention relates generally to information aggregation systems and, more particularly, to systems and methods for browsing aggregated historical content.

2. Description of Related Art

Existing news aggregation services (e.g., Google News) search out, and aggregate, news content published on web pages throughout the Internet. These news aggregation services then aggregate the news from thousands of news sources in real time and provide them to users that access news content via the news aggregation service. When using these news aggregation services, recent news articles (e.g., news articles from the past 3 days) are grouped together to form news clusters representing a single "news story" in the news. Specifically, the news clusters are scored based on recency, size, and geographical and topical preferences.

In response to a search query from a user, or when a user browses a newspaper section of the news aggregation service, clusters of news items that match the search query are ranked based on a match between the search query and the clusters of news items and a recency and size associated with the news clusters to produce a relevant and high quality ranking. Based on the ranking, the news aggregation service may present a list of stories, from the aggregated news content, to the user, with each story involving a group of articles from different publications dealing with the same topic. Users may periodically access the news aggregation service to re-enter a search query and view relevant news stories to keep abreast of developments in the news. News article lists that are displayed as a result of the existing news content searching and ranking processes tend to be unwieldy, with, possibly, up to hundreds of news articles being contained in the list. Existing news article lists, thus, can make it difficult for a news browser to ascertain, in an easy fashion, how a news story develops over time.

Accordingly, it would be desirable to implement a news browsing service that enables news browsers to quickly and easily ascertain the progression of one or more news stories over time.

SUMMARY OF THE INVENTION

Systems and methods, consistent with the principles of the invention, implement a news browsing service that may provide news documents, in response to news search queries, that can graphically plot the progression of one or more news stories over time. The news documents may include a graphical user interface that displays plots of new stories versus time, and permits news browsers to select specific news articles or news clusters from the plotted news stories to view the associated news content.

According to one aspect consistent with the principles of the invention, a method of plotting one or more sequences of articles with respect to time is provided. The method may include receiving one or more search queries, wherein data including a time period is associated with at least one of the one or more search queries. The method may further include executing the one or more search queries to search content that was published within the time period and receiving results of the one or more executed search queries. The method may also include providing a document that plots one or more sequences of articles, with respect to time, corresponding to the results of the one or more executed search queries.

According to another aspect, a method of graphically plotting articles is provided. The method includes executing one or more search queries to search stored articles and receiving results of the executed one or more search queries, wherein the results identify selected articles of the stored articles. The method further includes designating a graphical marker for each of the selected articles and plotting each of the graphical markers on a graphical display.

According to a further aspect, a method of plotting one or more sequences of articles is provided. The method may include identifying a time period and determining one or more sequences of articles from a corpus of articles that were available within the identified time period. The method may further include plotting, in a multi-dimensional graph, the one or more sequences of the available news articles

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 3A, 3B, 3C and 3D are flowcharts of exemplary processing for providing graphical displays of historical news articles according to an implementation consistent with the principles of the invention;

DETAILED DESCRIPTION

The following detailed description of the invention refers to the accompanying drawings. The same reference numbers in different drawings may identify the same or similar elements. Also, the following detailed description does not limit the invention.

Systems and methods consistent with the principles of the invention implement a news browsing service that plots the progression of one or more news stories over time via, for example, a graphical user interface. Consistent with one implementation of the invention, the graphical user interface may display historical news documents that may plot new stories over time and permit news browsers to select specific news articles from the plotted news stories.

A "document," or "article," as the term is used herein is to be broadly interpreted to include any machine-readable and machine-storable work product. A document or article may include an e-mail, a web site, a file, a combination of files, one or more files with embedded links to other files, a news group posting, a blog, a web advertisement, etc. In the context of the Internet, a common document or article is a web page. Web pages often include textual information and may include embedded information (such as meta information, images, hyperlinks, etc.) and/or embedded instructions (such as Javascript, etc.).

Exemplary Network Configuration

Figure 1:
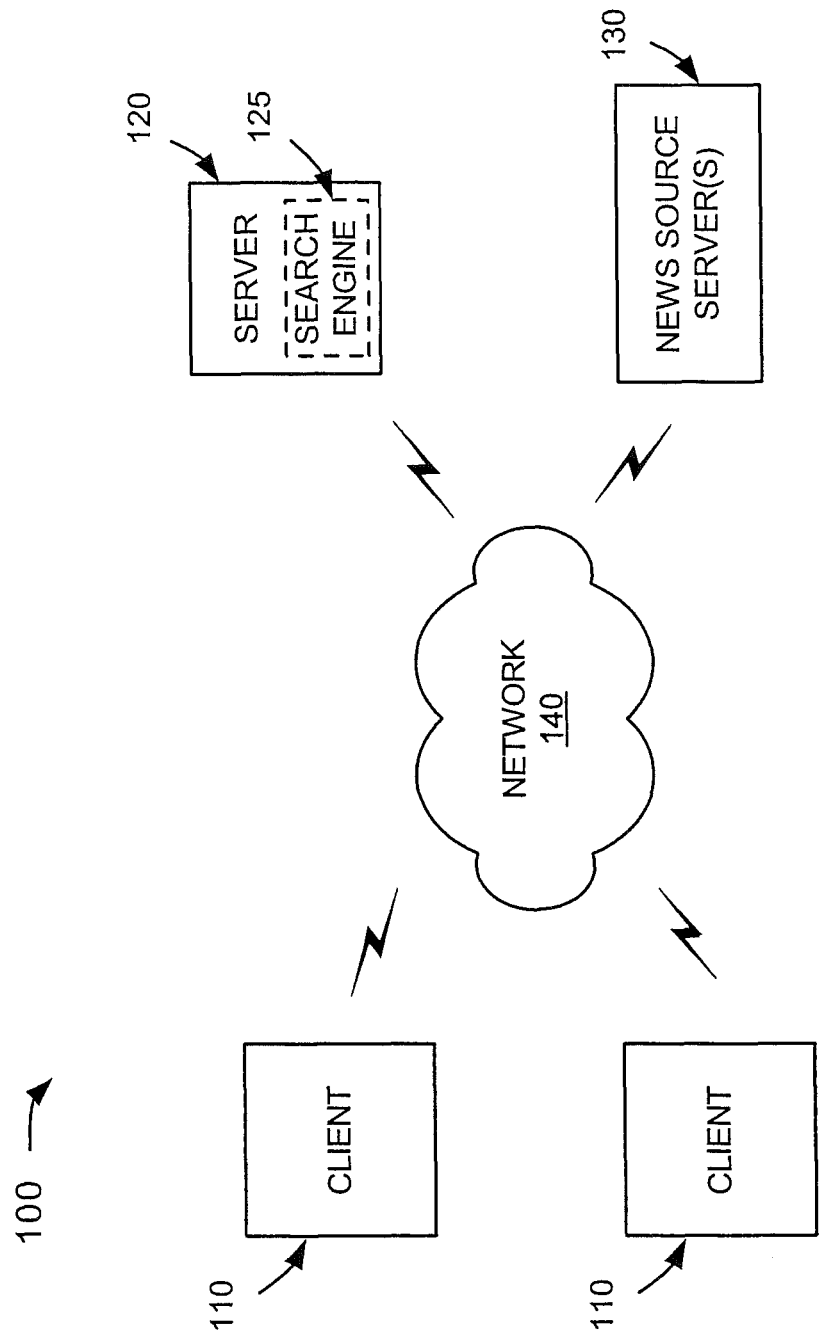
FIG. 1 is a diagram of an exemplary network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to multiple servers 120-130 via a network 140. Network 140 may include a local area network (LAN), a wide area network (WAN), a telephone network, such as the Public Switched Telephone Network (PSTN), an intranet, the Internet, a memory device, another type of network, or a combination of networks. Two clients 110 and two servers 120-130 have been illustrated as connected to network 140 for simplicity. In practice, there may be more or fewer clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a laptop, or another type of computation or communication device, a thread or process running on one of these devices, and/or an object executable by one of these devices. Servers 120-130 may include server entities that gather, process, search, and/or maintain documents in a manner consistent with the principles of the invention. Clients 110 and servers 120-130 may connect to network 140 via wired, wireless, and/or optical connections.

In an implementation consistent with the principles of the invention, server 120 may include a search engine 125 usable by users at clients 110. Server 120 may implement a news aggregation service by crawling a corpus of news content documents (e.g., web pages) hosted on news source server(s) 130 and store information associated with these news content documents in a repository of crawled documents. The news aggregation service may be implemented in other ways, such as by agreement with the news services to distribute their news articles to the news aggregation service. Server 120 may additionally provide graphical displays of historical news stories that are relevant to one or more news search queries received from clients 110. The graphical displays may plot historical news stories, in multiple dimensions, as a function of time over a time window specified by users associated with clients 110. Server(s) 130 may store or maintain news content documents that may be crawled by server 120. Such news content documents may include recently published news stories, or older (i.e., not recent), archived news stories. such news content documents may include news from any type of news source, such as, for example, the Washington Post, the New York Times, Time magazine, or Newsweek.

While servers 120-130 are shown as separate entities, it may be possible for one or more of servers 120-130 to perform one or more of the functions of another one or more of servers 120-130. For example, it may be possible that two or more of servers 120-130 are implemented as a single server. It may also be possible for a single one of servers 120-130 to be implemented as two or more separate (and possibly distributed) devices.

Exemplary Client/Server Architecture

Figure 2:
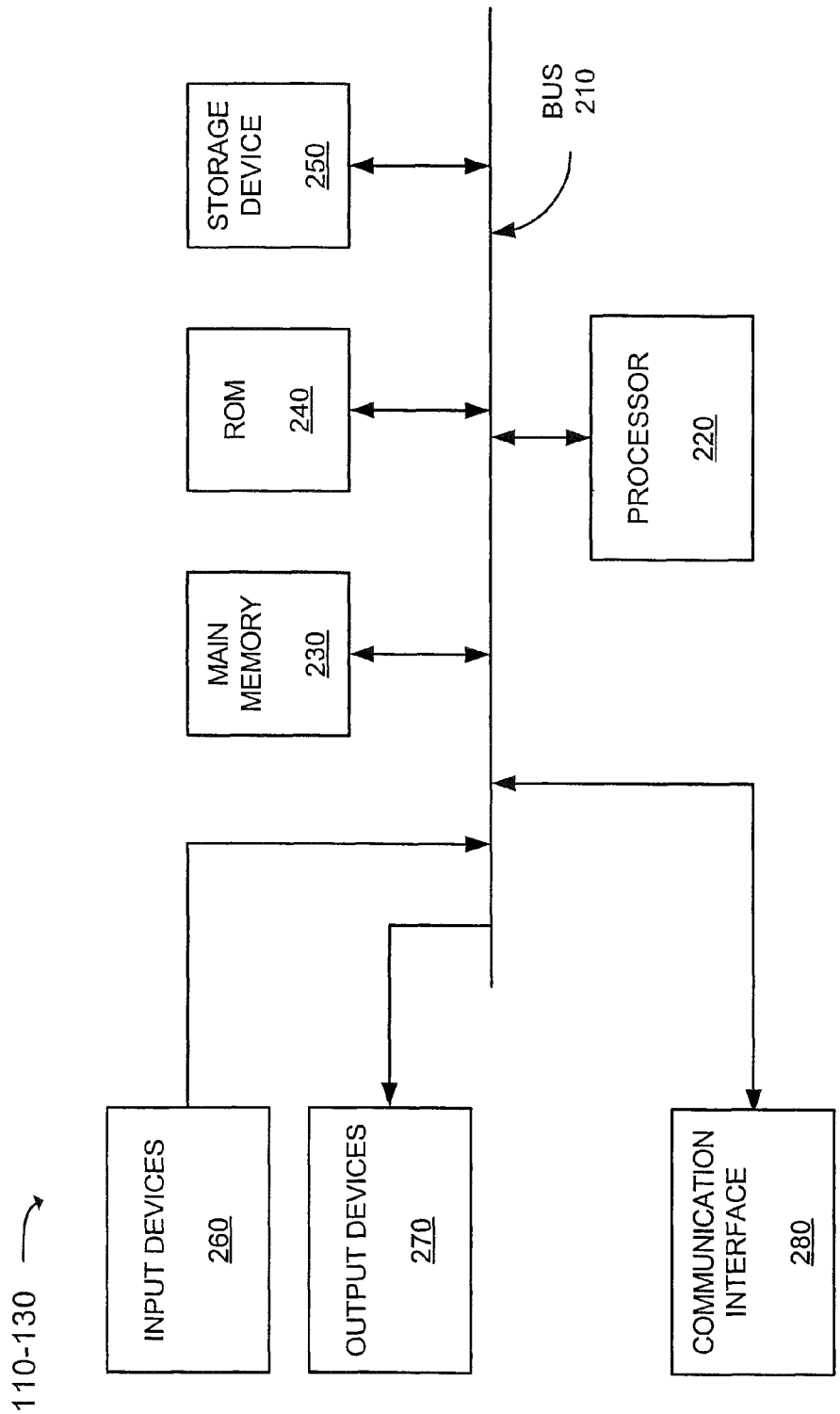
FIG. 2 is an exemplary diagram of a client and/or server of FIG. 1 in an implementation consistent with the principles of the invention.

FIG. 2 is an exemplary diagram of a client or server entity (hereinafter called "client/server entity"), which may correspond to one or more of clients 110 and servers 120-130, according to an implementation consistent with the principles of the invention. The client/server entity may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of the client/server entity.

Processor 220 may include logic that, in some implementations, may further include one or more types of conventional processors or microprocessors that interpret and execute instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit an operator to input information to the client/server entity, such as a keyboard, a mouse, a pen, voice recognition and/or biometric mechanisms, etc. Output device(s) 270 may include one or more conventional mechanisms that output information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 140.

As will be described in detail below, the client/server entity, consistent with the principles of the invention, performs certain searching-related operations. The client/server entity may perform these operations in response to processor 220 executing software instructions contained in a computer-readable medium, such as memory 230. A computer-readable medium may be defined as one or more physical or logical memory devices and/or carrier waves.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing

FIGS. 3A, 3B, 3C and 3D are flowcharts of exemplary processing for rendering a graphical display of historical news content according to an implementation consistent with the principles of the invention. As one skilled in the art will appreciate, the processing exemplified by FIGS. 3A, 3B, 3C and 3D can be implemented in software and stored on a computer-readable memory, such as main memory 230, ROM 240 or storage device 250 of server 120. In other implementations, the processing exemplified by FIGS. 3A, 3B, 3C and 3D can be implemented in hardwired circuitry, such as combinational logic, within server 120.

Processing may begin with server 120 accessing external news sources (e.g., from server 130), fetching the news content stored at the news sources and aggregating the fetched news content in memory, such as, for example, a local memory (act 305) (FIG. 3A). For example, server 120 may use a news crawler (e.g., web robot) that may access news content documents hosted by news source server(s) 130. News source server(s) 130 may host, for example, news content from the Washington Post, the New York Times, or any other news content site. The fetched news content may then be indexed and grouped, using conventional indexing and grouping algorithms (act 310).

Server 120 may then receive one or more news search queries from a user at client 110 (act 315). Each of the one or more news search queries may include a time window that specifies a time period over which a respective search query should be searched. A number of search queries may be supported by server 120, including (but not limited to) the following search query forms: (a) one or more keywords (e.g., 'bush,' bush iraq,' etc.); (b) topical categories (e.g., 'topic=sports,' 'topic=sport-basketball'; (c) geographical categories (e.g., 'geo=usa,' 'geo=north america,' 'geo=china'); (d) geographical reporting areas (e.g., U.S. newspapers, European newspapers, etc.); (e) restrictions on the news sources to be considered (e.g., a list of news sources to be searched, a list of news sources not to be searched); and/or (g) a time window that defines a start and end of a time interval from which articles may be retrieved. A search query may additionally include any combination of the above forms of search query.

Figure 4:
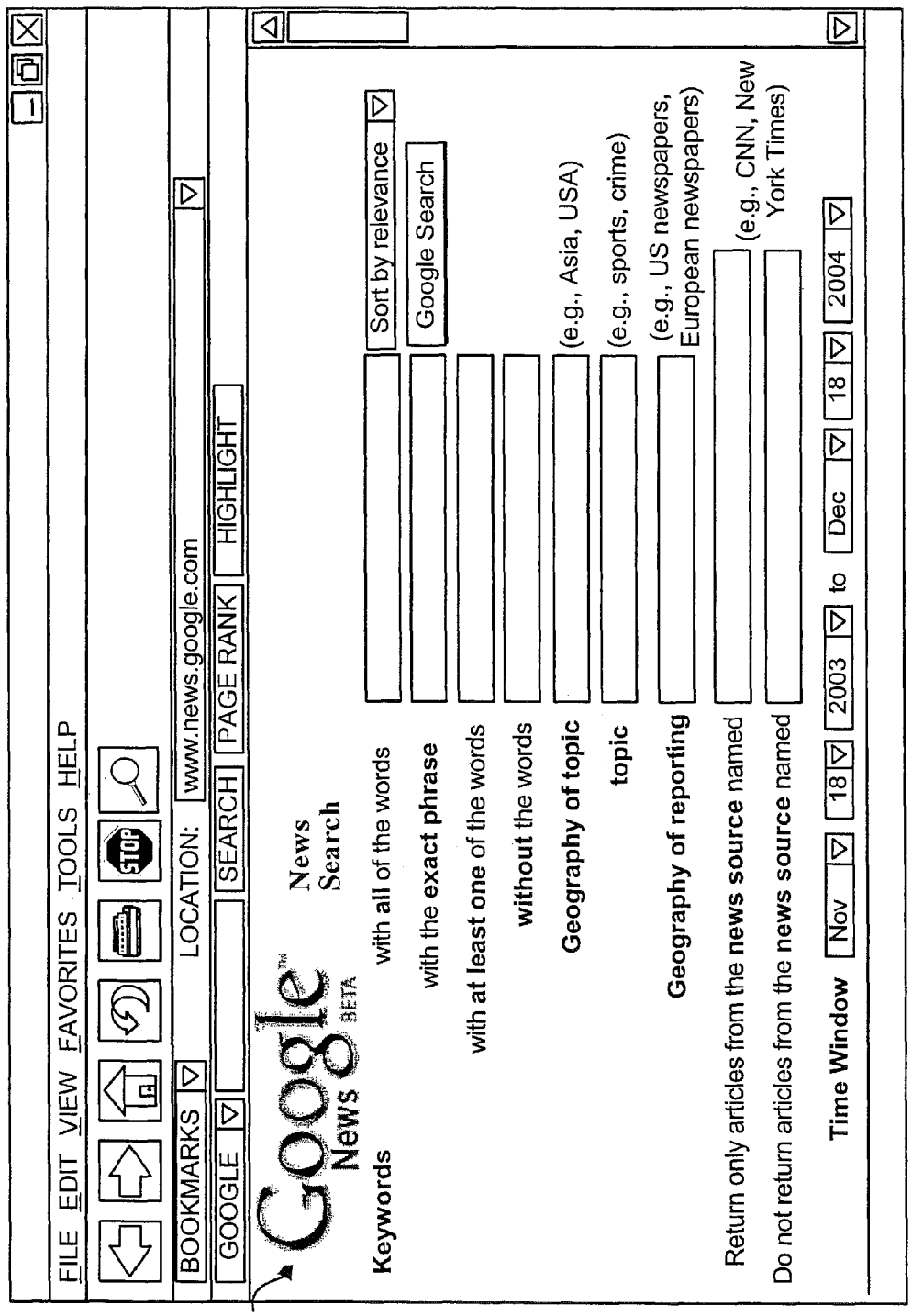
FIG. 4 is a diagram of an exemplary news search document according to an implementation consistent with the principles of the invention.

In one implementation of the invention, as shown in FIG. 4, a user may enter search text in a news search page 400. News search page 400 may include various search features that permit, for example, the user to search for phrases or topics contained in the news content, etc. Furthermore, news search queries entered by the user in the past may be ranked based on recency and frequency and made accessible through a menu placed on the search page. Selecting such a search query may reissue the news search query. Additionally, one or more news search queries may be inferred from the user's past news browsing activity (e.g., a news search query may include an inferred set of keywords, geographical preferences, etc.). Server 120 may then store the one or more search queries in memory (e.g., main memory 230, ROM 240 or storage device 250) (act 320).

Figure 3B:
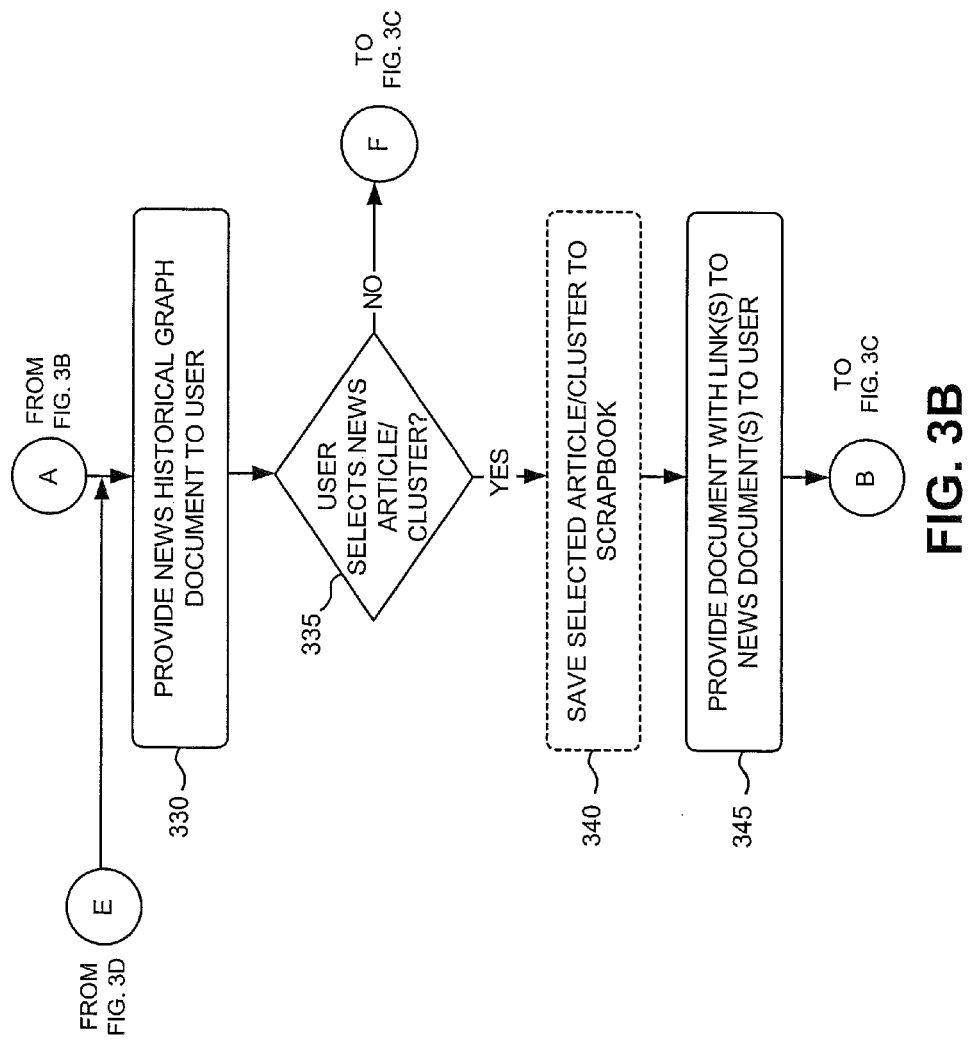

Server 120, using search engine 125, may execute the one or more news search queries (act 325). The results of the executed news search queries may be merged based on scores computed by search engine 125. The results of the executed news search queries may also be clustered based on a date and/or content associated with news articles that resulted from the news search queries. The results of the executed news search queries may be provided to the user as a news historical graph document (act 330) (FIG. 3B). The news historical graph document may include a multi-dimensional display in which one dimension (e.g., the x-axis) represents time, and another dimension (e.g., the y-axis) represents a cluster of news stories, corresponding to respective news search queries, depicted as a sequence of individual news articles rendered as a line (e.g., stretching horizontally). The amount of space available in the y-dimension may dictate the number of news clusters shown (e.g., one cluster per 50 pixels along the y-axis). For example, if a user sends two search queries, one related to cycling in the Olympics, and the other related to boxing in the Olympics, the news historical graph may represent a first horizontal line for the news cluster that corresponds to the search query related to cycling in the Olympics and a second horizontal line for the news cluster that corresponds to the search query related to boxing in the Olympics. The length of each horizontal line may show the temporal extent of a corresponding news cluster, and individual markings on each horizontal line may represent individual news articles. The individual marking on each horizontal line may include, but are not limited to, dots, icons, or characters, or any combination of dots, icons or characters. In one implementation consistent with the invention, only the most relevant and/or important news clusters may be shown within the available space of the news historical graph. For example, if only 15 news clusters can be shown, the news historical graph may show the top 15 news clusters in rank order. The multi-dimensional display of the news historical graph document may include dimensions greater than two, such as, for example, a three-dimensional display in which the x-axis shows time, the z-axis shows different topics, and, for each z-plane (i.e., each topic) different y coordinates correspond to "threads" on the topic that either come together to a single y coordinate (i.e., the threads unite) or split from a single y coordinate into many (i.e., a thread splits).

In one implementation consistent with the invention, graphs from two or more distinct news search queries may be combined to see how two sets of events are related. For example, a search query related to the Iraq war can be graphed along with a search query related to business activity to visually depict how the Iraq war affected business activity. In other implementations consistent with the invention, other events of interest can be plotted on the same news historical graph as the one showing news articles to detect correlations between news and other events. For example, events of interest, such as stock market activity, prices of commodities, health statistics, etc. may be plotted on the same news historical graph as news articles.

Figure 5:
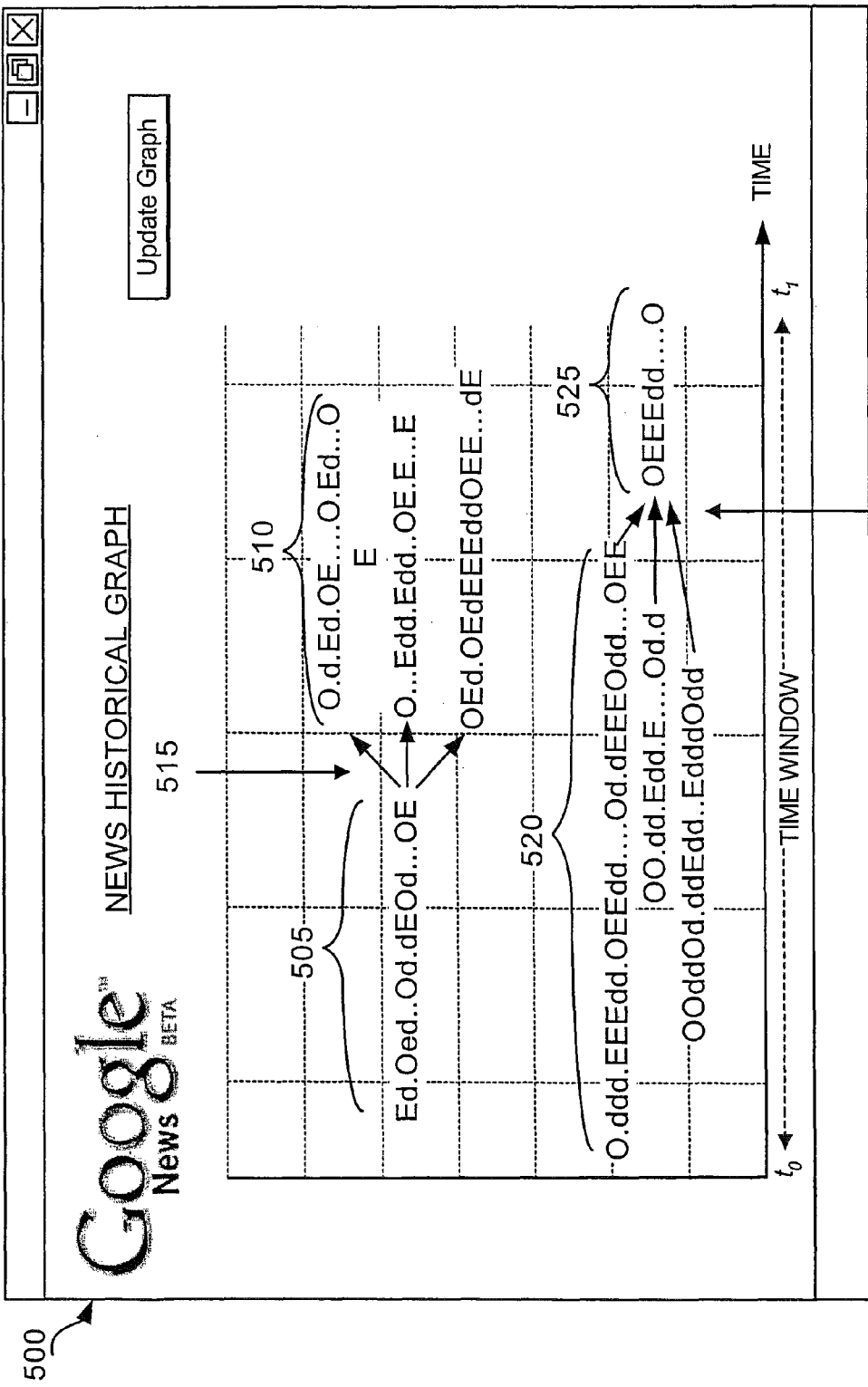
FIG. 5 is a diagram of an exemplary news historical graph document according to an implementation consistent with the principles of the invention.

In the news historical graph document, original stories may be marked in a certain way (e.g., an icon of a certain color or shape). Duplicate stories, breaking news, editorials, Opeds, wire stories, and stories from news sources preferred by the user may each be marked in specific and different ways. For example, each of the different types of stories may be marked in different colors, or icons of different shapes. Those skilled in the art may combine icons, dots, characters and colors and sizes in various ways to indicate all the interesting features of a news cluster. FIG. 5 illustrates an exemplary news historical graph document 500 consistent with one implementation of the invention. In news historical graph document 500, original news stories are marked with an "O," duplicate news stories are marked with a "d," editorials are marked with an "E," and the absence of a news story within a time span is marked with an ".". Any characters, symbols, icons, etc., however, may alternatively be used instead of, or in addition to, the symbols shown in FIG. 5.

In the news historical graph document, the density of clustering may be managed depending on the resolution of the displayed plot. The resolution may, for example, be adjusted, such as by a user using standard graphical user interface devices (e.g. slider knobs, +/− or zoom buttons, etc.). For example, at a coarse setting very large news clusters may be shown. At a finer setting, large news clusters may decompose into finer clusters showing more detail. Graphically, when the displayed plot is changed from coarse news clusters to finer news clusters, a single long horizontal line may decompose into many shorter horizontal lines on distinct y-coordinates. Related news clusters may be shown adjacently in the y-axis. For example, all cycling stores may occupy a range of y-coordinates. In some embodiments, a third dimension may be employed, such that, for example, the cycling stories may occupy a y-plane but have different z-coordinates.

If a news story splits into many related but distinct news stories, then the split may be rendered by arrows pointing from a first news cluster to multiple news clusters. For example, the start of the Iraq war could be one story (Cluster 0) that splits into three news clusters: (1) cluster 1 that includes events in Iraq; (2) cluster 2 that includes reaction from around the world; and (3) cluster 3 that includes reaction within the U.S. Splitting of the first news cluster into related but distinct news stories may, thus, permit an analysis of the genesis of a story. As an illustrative example, news historical graph document 500 of FIG. 5 depicts a news cluster 505 splitting into three separate news clusters 510 via arrows 515.

Similarly, if many seemingly disconnected events come together, then smaller news clusters may merge into a large news cluster. This may be rendered in the news historical graph document by multiple arrows converging from multiple news clusters to a single news cluster. For example, many election related news clusters about individual election campaigns may converge into a single news cluster about the actual election when election day comes. As an illustrative example, news historical graph document 500 of FIG. 5 depicts three news clusters 520 converging into a single news cluster 525 via arrows 530. It will be apparent that, although the splitting news clusters 510 and the converging news clusters 520 are shown in FIG. 5 in the y-dimension, a third dimension could also be used to visually represent these effects. Similarly, a third dimension may be employed to convey a variety of additional information regarding news stories and or news clusters, as would be apparent to one of ordinary skill in the art.

If, for example, the user is using a "mouse" as an interface, moving the mouse over a target (e.g., a dot, icon, or character) corresponding to an article within a news cluster may cause the display of the contents of the article, or the display of at least a portion of the contents of the article (e.g., title, summary), either in a "popup" window, in a separate frame, or in an area of the existing window. A different action, such as, for example, "clicking" on a target (e.g., a dot, icon, or character) corresponding to an article may cause the entire contents of the article to be shown. Additionally, selecting (e.g., "clicking") a news cluster may cause a listing of the entire news cluster to be depicted graphically. In accordance with another aspect of the invention, a user may "draw" a box within the news historical graph (e.g., "click" and drag a cursor over a span of the graph) to restrict the span of the graph in time, or topics, and show more detail. Conversely, the span of the news historical graph may be expanded to hide detail, but cover a larger range of topics or temporal behavior.

Figure 6:
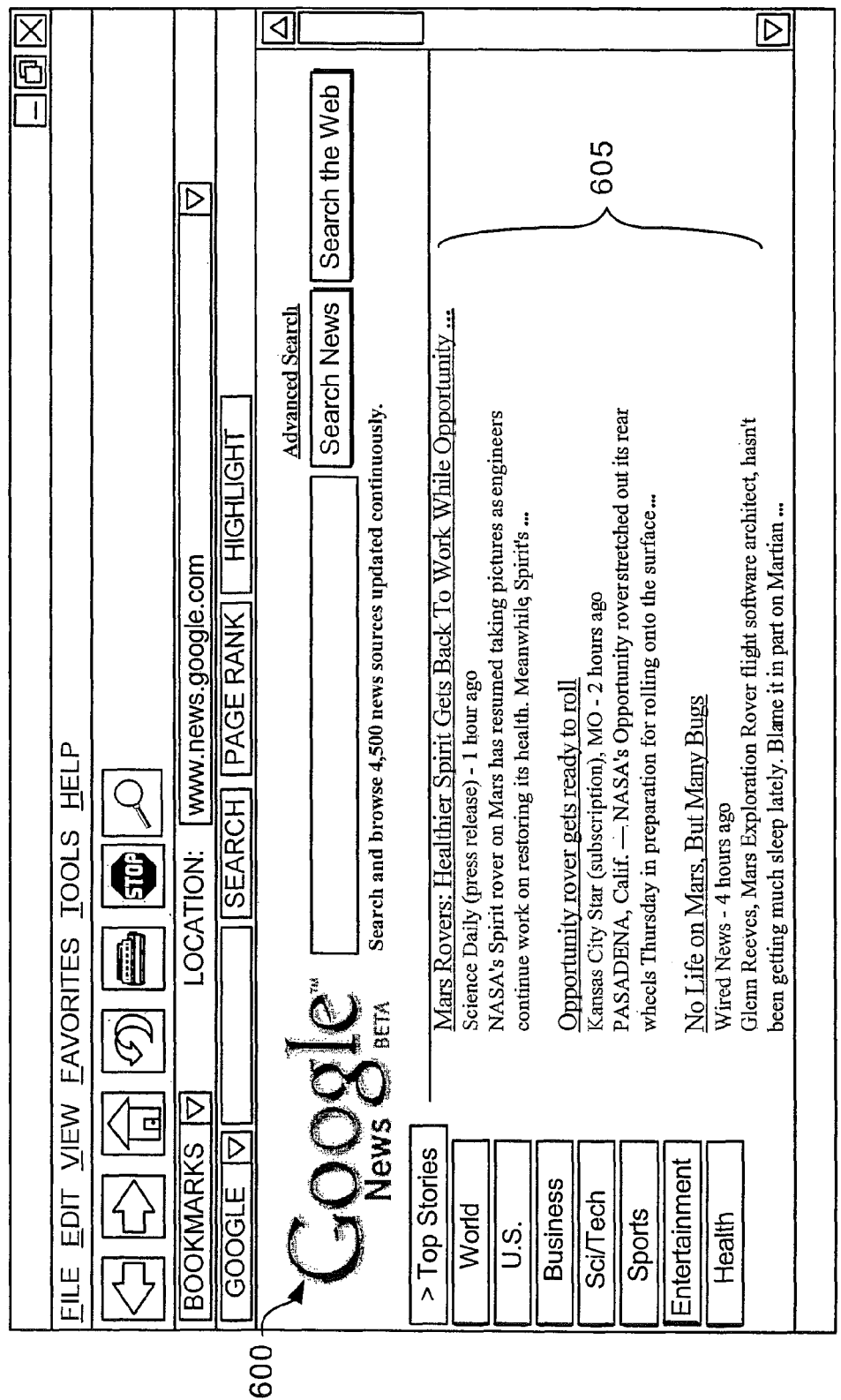
FIG. 6 is a diagram of an exemplary document with news links according to an implementation consistent with the principles of the invention.
Figure 7:
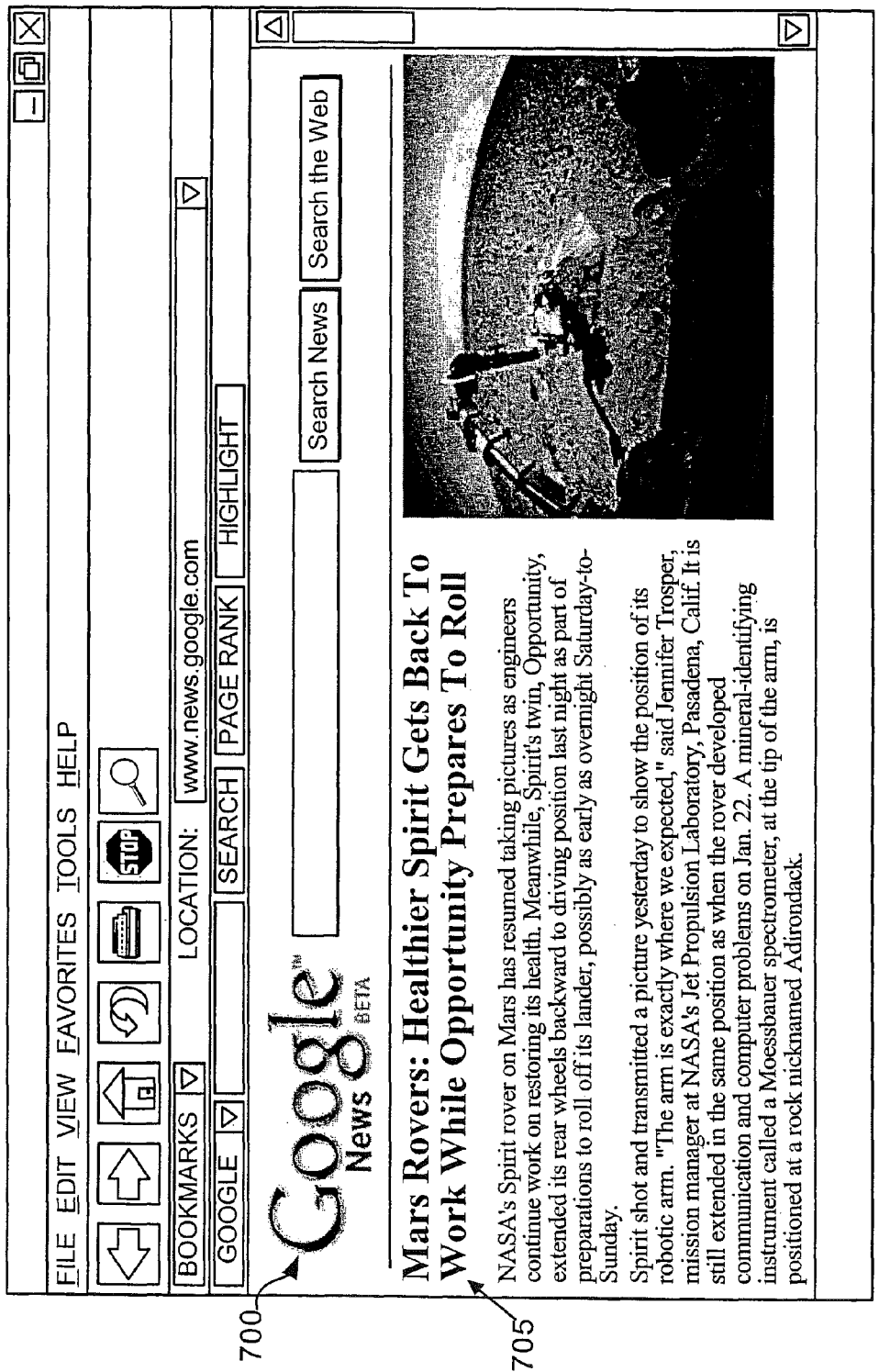
FIG. 7 is a diagram of an exemplary news document according to an implementation consistent with the principles of the invention.

Server 120 may determine whether a user selects a news article or news cluster from the provided news historical graph (act 335). If not, processing may continue at act 360 below (see FIG. 3C). If the user selects a news article or news cluster from the provided news historical graph, then server 120 may, optionally, save the selected news article or news cluster to a scrapbook (act 340). The contents of the scrapbook may be retrieved by the user at a later time. Server 120 may then provide a document with one or more links to news documents that correspond to the selected news article or news cluster (act 345). FIG. 6 illustrates an exemplary document 600 that includes multiple links 605 related to a story of interest to a user. Server 120 may determine whether the user selects one of the one or more links of the provided document (act 350) (FIG. 3C). If not, processing may continue at act 360 below. If the user selects one of the one or more links of the provided document, then server 120 may provide a news document(s) that corresponds to the selected link (act 355). FIG. 7 illustrates an exemplary news document 700 that includes a news story 705 that corresponds to a link selected by a user.

Figure 3D:
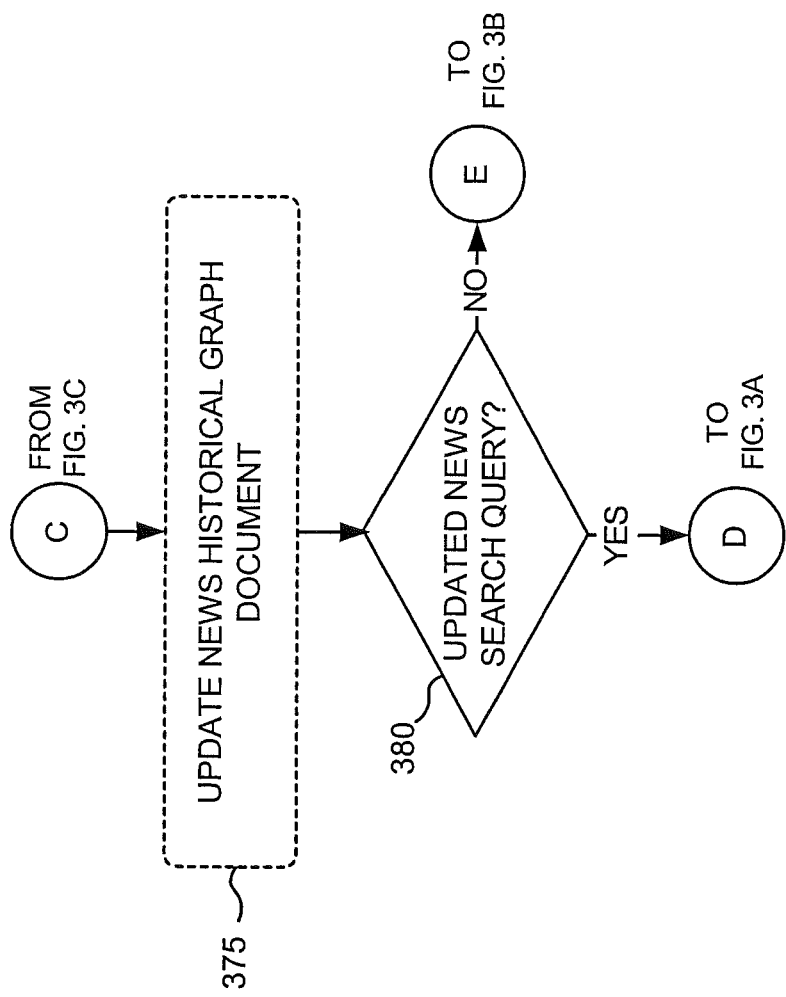

Server 120 may access external newspaper sources (e.g., news source server 130), fetch updated news content and aggregate the updated news content in local memory (act 360). For example, server 120 may use a news crawler (e.g., web robot) that may access updated news content documents hosted by news source server(s) 130. The fetched updated news content may be indexed and grouped, using conventional indexing and grouping algorithms (act 365). Server 120 may then execute the previously stored one or more news search queries (act 370). Server 120 may, optionally, use the results of the executed one or more news search queries to update the news historical graph document previously provided to the user (act 380) (FIG. 3D). Server 120 may then determine whether one or more updated news search queries are received from the user (act 385). If not, processing may continue at act 330 above (see FIG. 3B) to provide an updated news historical graph document to the user. If one or more updated news search queries are received from the user, then processing may return to act 315 above (see FIG. 3A).

CONCLUSION

Systems and methods consistent with the principles of the invention enable a news browser to plot the progression of one or more news stories over time. In some implementations consistent with the invention, a graphical user interface may be used to display historical news documents that plot new stories over time and permit news browsers to select news articles from the plotted news stories to view the associated news content.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 3A, 3B, 3C and 3D, the order of the acts may be modified in other implementations consistent with the principles of the invention. Also, non-dependent acts may be performed in parallel. While aspects of the invention have been described with respect to news articles, the exemplary techniques of the invention may be applied to any type of document or article, not just news articles. For example, the exemplary techniques of the invention may be applied to web pages, or articles of any kind or sort.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

Further, certain portions of the invention have been described as "logic" that performs one or more functions. This logic may include hardware, such as an application specific integrated circuit or a field programmable gate array, software, or a combination of hardware and software.

The scope of the invention is defined by the following claims and their equivalents.

What is claimed is:

1. A method comprising:
   receiving a reference to a particular period of time;
   identifying a plurality of documents relating to the particular period of time and one or more of a keyword or a topic;
   determining a type for each of the plurality of documents;
   identifying a visual indicator, from a plurality of visual indicators, associated with each of the plurality of documents based on the determined type;
   plotting at least some of the identified visual indicators as one or more sequences to represent a progression of at least a first group of content from the plurality of documents over the particular period of time, the plotting graphically depicting a visual indicator, of the at least some of the identified visual indicators, as splitting into:
      a first group of visual indicators representing a second group of content from the plurality of documents, and
      a second group of visual indicators representing a third group of content from the plurality of documents; and
   providing results of the plotting.

2. The method of claim 1, further comprising:
   receiving a selection of a first visual indicator of the at least some of the identified visual indicators;
   identifying a user action associated with the selection of the first visual indicator; and
   providing one or more portions of the first group of content based on the identified user action associated with the received selection.

3. The method of claim 2, where providing the one or more portions includes one or more of:
   displaying the one or more portions in a popup window,
   displaying the one or more portions in a frame that is separate from a frame displaying the first visual indicator, or
   displaying a list of documents, of the plurality of documents, where each document, of the list of documents, includes content included in the first group of content.

4. The method of claim 1, where the plurality of documents includes one or more web advertisements displayed on one or more web pages during the particular period of time.

5. The method of claim 1, where plotting the at least some of the identified visual indicators includes:
   plotting information identifying one or more events unrelated to the one or more of the topic or the keyword, the one or more events occurring during the particular period of time.

6. The method of claim 1, where plotting the at least some of the identified visual indicators includes:
   including relational indicators that depict the first group of content as splitting into the second group of content and the third group of content.

7. The method of claim 1, where providing the results of the plotting includes:
   providing the graphical depiction to a client based on a search query received from the client, where the search query includes the reference to the particular period of time and the one or more of the topic or the keyword.

8. A system comprising:
   one or more computer devices to:
      receive a reference to a particular period of time,
      identify a plurality of documents relating to the particular period of time,
      determine a type for each of the plurality of documents, a first type determined for a first document, of the plurality of documents, being different than a second type determined for a second document, of the plurality of documents,
      identify a visual indicator, from a plurality of visual indicators, for each of the plurality of documents based on the determined type, at least one of the plurality of visual indicators being different than another one of the plurality of visual indicators,
      form a graphical depiction that plots at least some of the identified visual indicators as one or more sequences to represent a progression of at least a first group of content from the plurality of documents over the particular period of time, the graphical depiction graphically depicting a visual indicator, of the at least some of the identified visual indicators, as branching into:
         a first group of visual indicators representing a second group of content from the plurality of documents, and
         a second group of visual indicators representing a third group of content from the plurality of documents, and
      output the graphical depiction.

9. The system of claim 8, where the one or more computer devices are to:
   receive a selection of a first visual indicator of the at least some of the identified visual indicators,
   identify a user action associated with the selection of the first visual indicator, and
   provide one or more portions of the first group of content based on the identified user action associated with the received selection.

10. The system of claim 9, where, when providing the one or more portions, the one or more computer devices are to at least one of:
    display the one or more portions in a popup window,
    display the one or more portions in a frame that is separate from a frame displaying the first visual indicator, or
    display a list of documents, of the plurality of documents, where each document, of the list of documents, includes content included in the first group of content.

11. The system of claim 8, where the plurality of documents includes one or more web advertisements displayed on one or more web pages during the particular period of time.

12. The system of claim 8, where, when forming the graphical depiction, the one or more computer devices are to:
    plot information identifying one or more events occurring during the particular period of time, the one or more events being related to content included in the first group of content.

13. The system of claim 8, where, when forming the graphical depiction, the one or more computer devices are to:
    provide relational indicators that show the first group of content as splitting into the second group of content and the third group of content.

14. A non-transitory computer-readable medium storing instructions, the instructions comprising:
    one or more instructions which, when executed by one or more processors, cause the one or more processors to:
       receive a reference to a particular period of time, identify a plurality of documents relating to the particular period of time and a topic or a keyword, determine a type for each of the plurality of documents, identify a visual indicator, from a plurality of visual indicators, for each of the plurality of documents based on the determined type, at least a first identified visual indicator being different than a second identified visual indicator, form a graphical depiction that plots at least some of the identified visual indicators as one or more sequences to represent a progression of at least a first group of content from the plurality of documents over the particular period of time, the graphical depiction graphically depicting a visual indicator, of the at least some of the identified visual indicators, as splitting into:

a first group of visual indicators representing a second group of content from the plurality of documents, and a second group of visual indicators representing a third group of content from the plurality of documents, and provide the graphical depiction.

15. The non-transitory computer-readable medium of claim 14, the instructions further comprising:

one or more instructions to receive a selection of a first visual indicator of the at least some of the identified visual indicators, one or more instructions to identify a user action associated with the selection of the first visual indicator, and one or more instructions to provide one or more portions of the first group of content based on the identified user action associated with the received selection.

16. The non-transitory computer-readable medium of claim 15, where the one or more instructions to provide the one or more portions include at least one of:

one or more instructions to display the one or more portions in a popup window, one or more instructions to display the one or more portions in a frame that is separate from a frame displaying the first visual indicator, or one or more instructions to display a list of documents, of the plurality of documents, where each document, of the list of documents, includes content included in the first group of content.

17. The non-transitory computer-readable medium of claim 14, where the plurality of documents includes one or more web advertisements presented during the particular period of time.

18. The non-transitory computer-readable medium of claim 14, where the one or more instructions to receive the reference to the particular period of time include:

one or more instructions to receive a search query that includes the reference to the particular period of time, and where the one or more instructions to form the graphical depiction include:

one or more instructions to plot, in the graphical depiction, information identifying one or more events occurring during the particular period of time, the one or more events being unrelated to the search query.

19. The non-transitory computer-readable medium of claim 14, where the one or more instructions to form the graphical depiction include:

one or more instructions to provide relational indicators that show the first group of content as splitting into the second group of content and the third group of content.

20. The non-transitory computer-readable medium of claim 14, where the one or more instructions to provide the graphical depiction include:

one or more instructions to provide the graphical depiction to a client based on a search query received from the client, where the search query includes the reference to the particular period of time and the one or more of the topic or the keyword.

* * * * *